(12) United States Patent
Tachimoto et al.

(10) Patent No.: US 10,018,649 B2
(45) Date of Patent: Jul. 10, 2018

(54) ACCELERATION SENSOR

(71) Applicant: TDK CORPORATION, Tokyo (JP)

(72) Inventors: Kazushi Tachimoto, Tokyo (JP); Yoshikazu Shimura, Tokyo (JP); Akira Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 50 days.

(21) Appl. No.: 15/257,511

(22) Filed: Sep. 6, 2016

(65) Prior Publication Data

US 2017/0067930 A1    Mar. 9, 2017

(30) Foreign Application Priority Data

Sep. 7, 2015   (JP) ................................. 2015-175996

(51) Int. Cl.
 *G01P 15/09*   (2006.01)
(52) U.S. Cl.
 CPC .................................. *G01P 15/09* (2013.01)

(58) Field of Classification Search
 CPC ........ G01P 15/09; G01P 15/097; G01P 15/133
 See application file for complete search history.

(56) References Cited

U.S. PATENT DOCUMENTS

2003/0164696 A1*  9/2003  Yamashita .............. G01P 15/09
                                                                324/76.49

FOREIGN PATENT DOCUMENTS

JP          2007-101448 A      4/2007

* cited by examiner

*Primary Examiner* — Erika J Villaluna
(74) *Attorney, Agent, or Firm* — Oliff PLC (57) ABSTRACT

An acceleration sensor capable of improving sensitivity is provided. In the acceleration sensor, although a solder fillet is formed in a lower end of a terminal electrode exposed from a covering portion, the covering portion suppresses the rise of the solder fillet. Due to this, the operation of the acceleration sensor is not easily limited by the solder fillet, and the acceleration sensor can generate electric charge which corresponds to a load more accurately. Therefore, the sensitivity of the acceleration sensor can be improved.

4 Claims, 13 Drawing Sheets

ACCELERATION SENSOR

CROSS-REFERENCE TO RELATED APPLICATIONS

This application is based upon and claims the benefit of priority from Japanese Patent Application No. 2015-175996, filed on Sep. 7, 2015, the entire contents of which are incorporated herein by reference.

TECHNICAL FIELD

The present disclosure relates to an acceleration sensor.

BACKGROUND

An acceleration sensor including a weight layer and a piezoelectric ceramic element which is polarized in a predetermined direction is known. In such an acceleration sensor, when inertial force acts on the weight layer due to external acceleration, electric charge is generated in the piezoelectric ceramic element due to the inertial force, and it is possible to detect vibration and to detect the magnitude of acceleration based on the electric charge.

The acceleration sensor can be electrically and mechanically connected to a circuit substrate by soldering. In this case, a solder fillet formed integrally with a terminal electrode of the acceleration sensor and the circuit substrate may limit movement, particularly in a slide direction (a direction parallel to a substrate surface). When the movement in the slide direction is limited in this manner, it may be difficult for the generated electric charge to correspond to a load caused by the acceleration accurately and it is difficult to obtain high detection accuracy.

Therefore, in Japanese Patent Application Publication No. 2007-101448, a piezoelectric layer in which electric charge is generated is disposed away from a circuit substrate so that movement of the piezoelectric layer is not easily limited by a solder fillet. In this way, the electric charge corresponds to a load caused by acceleration more accurately.

In Japanese Patent Application Publication No. 2007-101448, the piezoelectric layer has an inwardly depressed shape to realize a structure in which a solder fillet is not easily formed in the inwardly depressed portion and the operation of an acceleration sensor is less easily limited by the solder fillet.

As a result of intensive studies, the present inventors have found a new technique for improving the sensitivity of an acceleration sensor by making the operation of the acceleration sensor less easily limited by a solder fillet.

SUMMARY

According to the present disclosure, an acceleration sensor capable of improving sensitivity is provided.

An acceleration sensor according to an aspect of the present disclosure includes: an element body having a stacked structure; a pair of terminal electrodes on which the solder is to be formed; and a covering portion which covers the terminal electrodes and is formed of a non-solder-wettable material, wherein the element body includes a piezoelectric portion including at least one piezoelectric element structure having a structure in which a piezoelectric layer is sandwiched by a pair of electrode layers in a stacking direction of the element body, a base layer stacked on one side which is a side of the piezoelectric portion facing the substrate, and a weight layer stacked on the other side of the piezoelectric portion, the pair of terminal electrodes are provided on side surfaces of the element body, to which the electrode layers of the piezoelectric portion are drawn, and extend from a height position of the base layer of the element body to at least a height position of the drawn electrode layer, and the covering portion covers the terminal electrode in a portion of the side surface of the element body, covering at least the electrode layer and covers the base layer in a state in which at least a portion of the terminal electrode covering the base layer is exposed.

In such an acceleration sensor, the covering portion that covers the terminal electrode suppresses the rise of the solder fillet formed on the terminal electrode. Due to this, the operation of the acceleration sensor is not easily limited by the solder fillet and the sensitivity of the acceleration sensor can be improved.

The covering portion may have a recess which is formed in an end close to the base layer to be depressed toward the piezoelectric layer. In this case, it is possible to ensure that the acceleration sensor and the substrate are reliably connected by checking the solder fillet formed in the recess.

The covering portion may be formed of a resin, the piezoelectric portion may be bonded to the base layer and the weight layer with an adhesive layer interposed therebetween, and the covering portion may be in direct contact with the adhesive layer exposed to the side surface of the element body. Since the covering portion is formed of a resin, the bonding force between the covering portion and the adhesive layer is stronger than the bonding force between the covering portion and the terminal electrode. Due to this, when the covering portion is in direct contact with the adhesive layer, separation of the covering portion is suppressed, and the separation of the terminal electrode covered with the covering portion is also suppressed.

The adhesive layer may be exposed to both sides of the terminal electrode in a direction orthogonal to a stacking direction on the side surface of the element body, and the covering portion may cover across the terminal electrode in the direction orthogonal to the stacking direction on the side surface and may be in direct contact with both adhesive layers exposed to both sides of the terminal electrode. In this case, the separation of the terminal electrode is suppressed more effectively.

DETAILED DESCRIPTION

Hereinafter, an embodiment of the present disclosure will be described in detail with reference to the accompanying drawings. In the following description, the same components or components having the same functions will be denoted by the same reference numerals, and redundant description thereof will not be provided.

Figure 1:
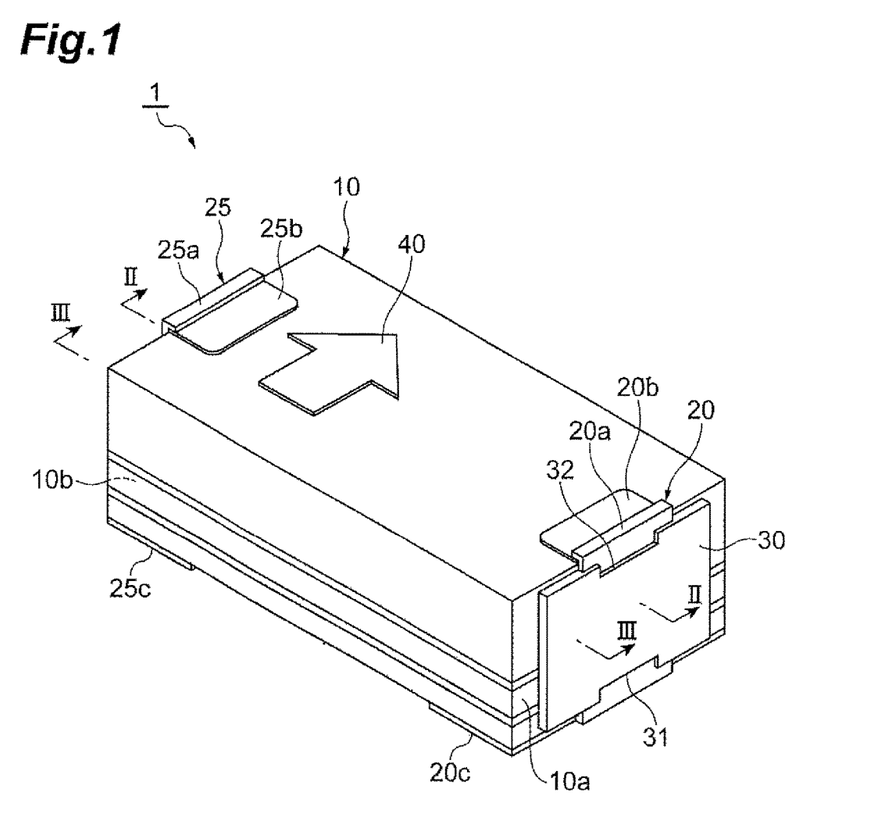
FIG. 1 is a schematic perspective view illustrating an acceleration sensor according to an embodiment.

As illustrated in FIG. 1, an acceleration sensor 1 includes an element body 10 and a pair of terminal electrodes 20 and 25 formed on side surfaces 10a and 10b of the element body 10.

Figure 2:
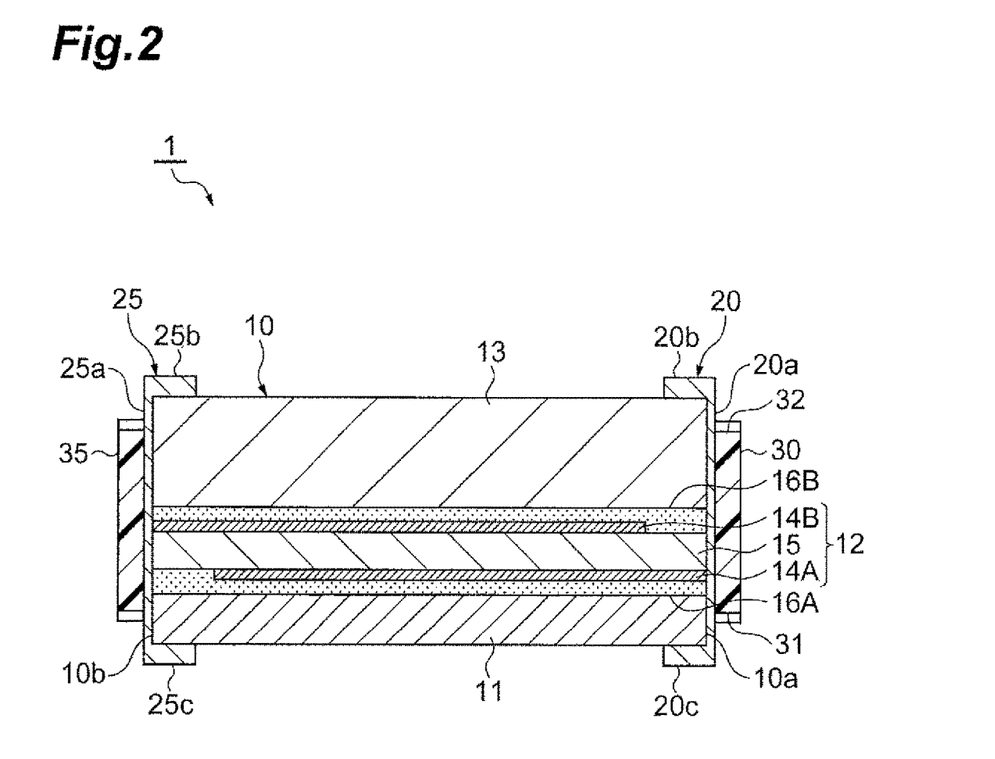
FIG. 2 is a cross-sectional view along line II-II of the acceleration sensor illustrated in FIG. 1.
Figure 3:
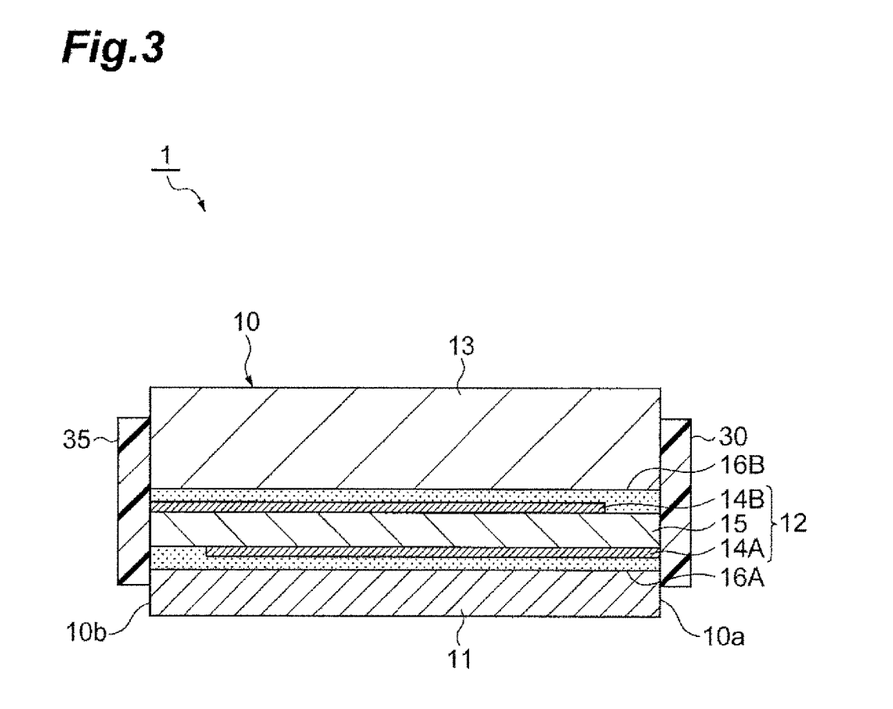
FIG. 3 is a cross-sectional view along line III-III of the acceleration sensor illustrated in FIG. 1.

As illustrated in FIGS. 2 and 3, the element body 10 has a stacked structure including a base layer 11, a piezoelectric portion 12, and a weight layer 13. The base layer 11, the piezoelectric portion 12, and the weight layer 13 have rectangular planar shapes of the same dimensions, and the element body 10 has a generally rectangular parallelepiped outer shape.

The piezoelectric portion 12 is formed of a piezoelectric element structure having a structure in which a piezoelectric layer 15 is sandwiched between a pair of electrode layers 14A and 14B (a sandwich structure) in a stacking direction (that is, a vertical direction in FIGS. 2 and 3) of the element body 10. The pair of electrode layers 14A and 14B of the piezoelectric portion 12 are drawn up to the pair of side surfaces 10a and 10b facing the element body 10. That is, the lower electrode layer 14A is drawn up to one side surface (the right side surface 10a in FIGS. 2 and 3), and the upper electrode layer 14B is drawn up to the other side surface (the left side surface 10b in FIGS. 2 and 3). In the present embodiment, the piezoelectric portion 12 is mounted on the circuit substrate 50 so that the base layer 11 faces the circuit substrate 50. The thickness of the piezoelectric portion 12 is, for example, 0.2 mm.

The piezoelectric layer 15 of the piezoelectric portion 12 is formed of a ceramic material mainly composed of, for example, lead zirconate titanate. The piezoelectric portion 15 is polarized, and the polarization direction is a direction orthogonal to the stacking direction and is a lateral direction of the piezoelectric layer 15. An arrow (identification mark) 40 indicating the polarization direction is formed on the surface of the element body 10.

The electrode layers 14A and 14B of the piezoelectric portion 12 are formed along the entire width (the entire length in the lateral direction) of the piezoelectric layer 15. The lower electrode layer 14A extends to one end in the longitudinal direction of the piezoelectric layer 15 to be drawn up to one side surface 10a of the element body 10. The upper electrode layer 14B extends to the other end in the longitudinal direction of the piezoelectric layer 15 to be drawn up to the other side surface 10b of the element body 10. The electrode layers 14A and 14B are formed of a conductive material mainly composed of, for example, Ag, Cu, Au, or the like, and are formed by sputtering in the present embodiment. The electrode layers 14A and 14B may be formed according to another method such as deposition or the like.

The base layer 11 is stacked on a side (the lower side in FIGS. 1 to 3) of the piezoelectric portion 12 close to the circuit substrate 50. The base layer 11 is formed of a ceramic material mainly composed of, for example, lead zirconate titanate. The thickness of the base layer 11 is, for example, 0.2 mm. The base layer 11 is bonded to the piezoelectric portion 12 with an adhesive layer 16A interposed therebetween. The adhesive layer 16A is formed of, for example, an epoxy resin-based adhesive.

The weight layer 13 is stacked on a side (the upper side in FIGS. 1 to 3) of the piezoelectric portion 12 opposite the circuit substrate 50. The weight layer 13 is formed of a ceramic material mainly composed of, for example, lead zirconate titanate, similarly to the base layer 11. The thickness of the weight layer 13 is, for example, 0.6 mm. The weight layer 13 is bonded to the piezoelectric portion 12 with an adhesive layer 16B interposed therebetween. The adhesive layer 16B is formed of an epoxy resin-based adhesive, for example, similarly to the adhesive layer 16A.

The weight layer 13 has a weight sufficient for applying a load to the piezoelectric portion 12. Since the weight layer 13 is provided, it is possible to reliably apply a load to the piezoelectric portion 12 formed between the weight layer 13 and the base layer 11.

The above-described element body 10 is obtained, for example, by preparing green sheets which serve as the base layer 11, the piezoelectric portion 12, and the weight layer 13, printing an electrode pattern appropriately, stacking the sheets to obtain a stacked structure, and baking the stacked structure.

The pair of terminal electrodes 20 and 25 are formed on the pair of side surfaces 10a and 10b from which the electrode layers 14A and 14B of the piezoelectric portion 12 are exposed. The terminal electrode 20 is connected to the electrode layer 14A on one side surface 10a. The terminal electrode 25 is connected to the electrode layer 14B on the other side surface 10b.

The terminal electrodes 20 and 25 include sputtering electrodes 20a and 25a formed by sputtering on the side surfaces 10a and 10b of the element body 10, upper-surface electrodes 20b and 25b printed partially on the upper surface of the element body 10 by baking, and bottom-surface electrodes 20c and 25c printed partially on the bottom surface of the element body 10 by baking, respectively. The upper ends of the sputtering electrodes 20a and 25a are connected to the upper-surface electrodes 20b and 25b, respectively, and the lower ends of the sputtering electrodes 20a and 25a are connected to the bottom-surface electrodes 20c and 25c, respectively. The electrodes 20a and 25a may be formed by another method such as deposition or the like as necessary.

The sputtering electrodes 20a and 25a of the terminal electrodes 20 and 25 are formed in a strip form extending in the stacking direction on the side surfaces 10a and 10b of the element body 10, respectively. When seen in the stacking direction, the sputtering electrodes 20a and 25a of the terminal electrodes 20 and 25 extend from the upper ends to the lower ends of the side surfaces 10a and 10b of the element body 10, respectively, to integrally cover the base layer 11, the piezoelectric portion 12, and the weight layer 13. When seen in the direction orthogonal to the stacking direction, the sputtering electrodes 20a and 25a of the terminal electrodes 20 and 25 are designed so that the width is narrower than the width of the element body 10, and the side surfaces 10a and 10b of the element body 10 are exposed to both sides in the width direction of the sputtering electrodes 20a and 25a.

The sputtering electrodes 20a and 25a of the terminal electrodes 20 and 25 may not necessarily reach the upper ends of the side surfaces 10a and 10b of the element body 10, respectively. However, in order for the terminal electrodes 20 and 25 to be connected to the corresponding electrode layers 14A and 14B, respectively, it is necessary to design the height positions of the upper ends of the sputtering electrodes 20a and 25a to be at the same or higher height positions than the positions at which the corresponding electrode layers 14A and 14B are exposed to the side surfaces 10a and 10b, respectively. The lower ends of the sputtering electrodes 20a and 25a are designed to be at the height position of the base layer 11.

The terminal electrodes 20 and 25 are formed of a metal material. The terminal electrodes 20 and 25 may be formed of a metal material that can satisfactorily be electrically connected to a metal such as Ag or the like that forms the electrode layers 14A and 14B. The sputtering electrodes 20a and 25a may be formed of a Cu sputtering layer.

The above-described electrodes 14A, 14B, 20a, and 25a are not limited to a single-layer structure but may have a multi-layer structure. When the electrodes 14A, 14B, 20a, and 25a have a multi-layer structure, the electrodes can be formed by providing a sputtering layer as an underlayer and forming a Ni- or Sn-plating layer on the sputtering layer. Particularly, in the electrodes 20a and 25a, a plating layer is formed to improve solder heat resistance and a solder wettable property mainly when the acceleration sensor 1 and the circuit substrate 50 are soldered together.

The terminal electrodes 20 and 25 are covered with covering portions 30 and 35, respectively. That is, the covering portions 30 and 35 are provided on the side surfaces 10a and 10b of the element body 10 to cover the terminal electrodes 20 and 25, respectively. Since the covering portions 30 and 35 cover the terminal electrodes 20 and 25, respectively, the terminal electrodes 20 and 25 (in particular, the sputtering electrodes 20a and 25a) are protected. The covering portions 30 and 35 are formed of a material having lower solder wettability (a so-called non-solder-wettable resin material such as an epoxy resin or a silicon resin). The covering portions 30 and 35 are formed, for example, by printing.

The shape of the covering portion 30 will be described with reference to FIG. 4. The covering portion 35 has the same shape as the covering portion 30, and the description thereof will not be provided.

Figure 4:
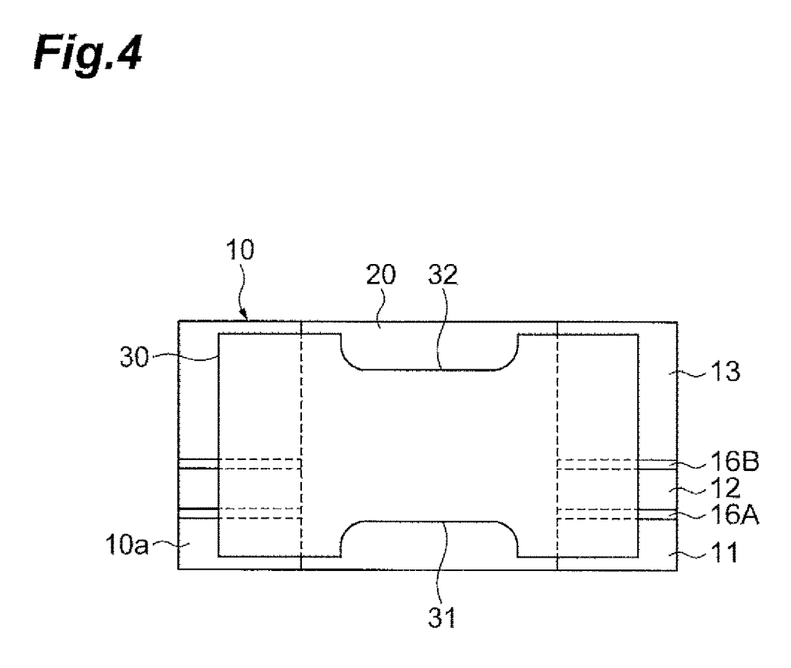
FIG. 4 is a side view illustrating the shape of a covering portion of the acceleration sensor illustrated in FIG. 1.

As illustrated in FIG. 4, the covering portion 30 is formed in a strip form extending in the stacking direction. The width of the covering portion 30 is designed to be wider than the width of the sputtering electrode 20a of the terminal electrode 20. Due to this, the covering portion 30 covers the side surface 10a of the element body 10 exposed to both sides in the width direction (that is, the direction orthogonal to the stacking direction) of the sputtering electrode 20a as well as the sputtering electrode 20a. In other words, the covering portion 30 covers the side surface 10a of the element body 10 exposed to both sides of the sputtering electrode 20a to extend across the sputtering electrode 20a in the width direction. The covering portion 30 is in direct contact with the adhesive layers 16A and 16B exposed to the side surface 10a of the element body 10. More specifically, the covering portion 30 is in direct contact with both adhesive layers 16A and 16B exposed to both sides of the sputtering electrode 20a.

The lower end of the covering portion 30 does not reach the lower end of the side surface 10a of the element body 10, and the terminal electrode 20 is exposed on the lower side of the covering portion 30. Similarly, the upper end of the covering portion 30 does not reach the upper end of the side surface 10a of the element body 10, and the terminal electrode 20 is exposed on the upper side of the covering portion 30. Moreover, a recess 31 that is depressed toward the upper side (the side close to the piezoelectric layer 15) is formed in the lower end (the end close to the base layer 11) of the covering portion 30. Furthermore, a recess 32 that is depressed toward the lower side is also formed in the upper end of the covering portion 30 in a vertically symmetrical form.

Figure 5:
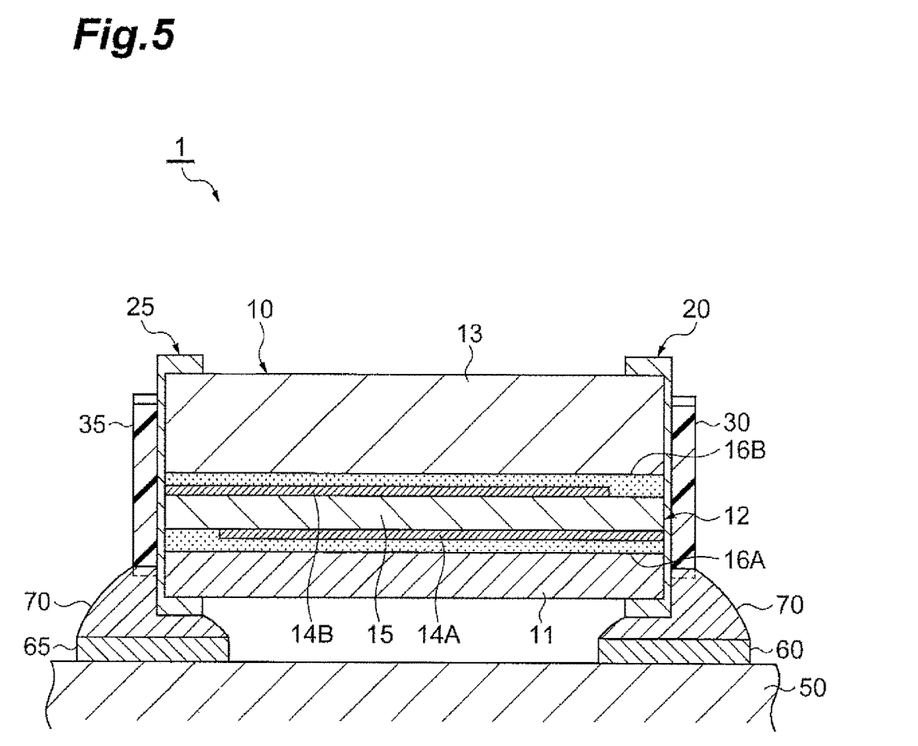
FIG. 5 is a diagram illustrating a state in which the acceleration sensor illustrated in FIG. 1 is mounted on a circuit substrate.

As illustrated in FIG. 5, the above-described acceleration sensor 1 is soldered onto the circuit substrate 50 to be parallel to the surface of the circuit substrate 50. The terminal electrodes 20 and 25 of the acceleration sensor 1 and corresponding land electrodes 60 and 65 formed on the circuit substrate 50 are integrally covered with a solder fillet 70 so that the terminal electrodes 20 and 25 are electrically and mechanically connected to the land electrodes 60 and 65, respectively. As described above, since the lower ends of the terminal electrodes 20 and 25 are exposed from the covering portions 30 and 35, respectively, and the recess 31 is formed in the lower ends of the covering portions 30 and 35, the solder fillet 70 is formed in portions of the terminal electrodes 20 and 25 exposed from the covering portions 30 and 35.

Here, in the acceleration sensor 1, when inertial force acts on the weight layer 13 due to external acceleration, a load is applied to the piezoelectric portion 12. When a load is applied to the piezoelectric portion 12, electric charge corresponding to the load component in the polarization direction is generated in the electrode layers 14A and 14B of the piezoelectric portion 12 and is output from the terminal electrodes 20 and 25. The terminal electrodes 20 and 25 are connected to a detection circuit provided on or outside the circuit substrate 50 by wires formed in the circuit substrate 50. The detection circuit converts the electric charge output from the acceleration sensor 1 to a voltage and outputs the voltage to an external circuit.

Conventionally, a solder fillet formed during soldering limits movement, particularly in a slide direction. As a result, the electric charge generated in a piezoelectric element does not accurately correspond to the load resulting from acceleration and the detection accuracy decreases.

In the acceleration sensor 1 described above, although the solder fillet 70 is formed on the lower ends of the terminal electrodes 20 and 25 exposed from the covering portions 30 and 35, the covering portion 30 suppresses the rise of the solder fillet 70. In the acceleration sensor 1, since the lower ends of the covering portions 30 and 35 are at the height position of the base layer 11, the solder fillet 70 does not rise above the height position of the base layer 11. Therefore, since the operation of the acceleration sensor 1 is not easily limited by the solder fillet 70 and can generate electric charge which corresponds to the load more accurately, the sensitivity is improved.

In the acceleration sensor 1, the recess 31 is formed in the lower ends of the covering portions 30 and 35 and the relatively large solder fillet 70 is formed in the recess 31. Due to this, it is possible to easily ensure that the acceleration sensor 1 and the circuit substrate 50 are reliably connected by checking the solder fillet 70 formed in the recess 31. In order for the solder fillet 70 to not rise above the height position of the base layer 11, the recess 31 may be designed so as not to reach the height position of the piezoelectric portion 12.

Furthermore, in the acceleration sensor 1, the covering portions 30 and 35 are in direct contact with the adhesive layers 16A and 16B exposed to the side surfaces 10a and 10b of the element body 10, respectively. Since the bonding force between the covering portions 30 and 35 and the adhesive layers 16A and 16B is stronger than the bonding force between the covering portions 30 and 35 and the terminal electrodes 20 and 25, when the covering portions 30 and 35 are in direct contact with the adhesive layers 16A and 16B, the bonding force of the covering portions 30 and 35 in relation to the element body 10 increases and separation of the covering portions 30 and 35 from the element body 10 is suppressed. Furthermore, as illustrated in FIG. 4, since the covering portion 30 is provided on the side surface 10a of the element body 10 to extend across the sputtering electrode 20a of the terminal electrode 20, when the bonding force of the covering portion 30 in relation to the element body 10 increases, separation of the terminal electrode 20 covered with the covering portion 30 from the element body 10 is also suppressed. In particular, since it is difficult to obtain sufficient bonding force between the sputtering electrode 20a and the element body 10 and the sputtering electrode 20a is easily separated from the element body 10, it is effective to bring the covering portions 30 and 35 into direct contact with the adhesive layers 16A and 16B, respectively.

As described above, the acceleration sensor 1 includes the piezoelectric layer 15 which is polarized in one axial direction only. In a conventional acceleration sensor which is polarized in multiple axial directions, since the load is decomposed into components in respective axial directions, the sensitivity decreases. However, in the acceleration sensor 1 which is polarized in one axial direction, high sensitivity can be obtained. Moreover, while an electrode thickness tends to increase in the conventional acceleration sensor which is polarized in multiple axial directions, the thickness of the uniaxially polarized acceleration sensor 1 can be reduced.

The above-described covering portion 30 is not limited to the above-described aspect and various aspects can be employed. Hereinafter, modifications of the covering portion 30 will be described with reference to FIG. 6 to FIGS. 11A to 11C.

Figure 6:
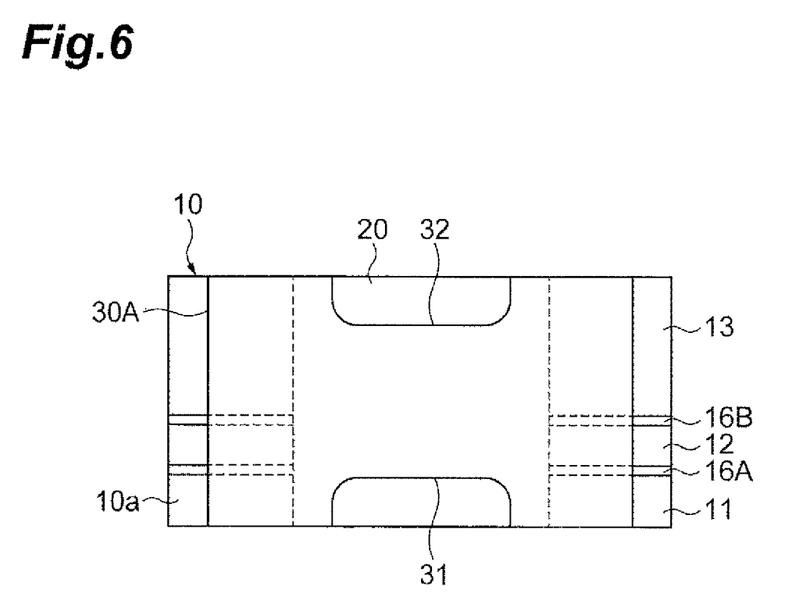
FIG. 6 is a side view illustrating a covering portion of an aspect different from FIG. 4.

A covering portion 30A illustrated in FIG. 6 is different from the above-described covering portion 30 in that the lower end thereof reaches the lower end of the side surface 10a of the element body 10 and the upper end thereof reaches the upper end of the side surface 10a of the element body 10. In such a covering portion 30A, the terminal electrode 20 is exposed in the lower recess 31. When the lower end reaches the lower end of the side surface 10a of the element body 10 like the covering portion 30A, separation of the lower end of the terminal electrode 20 is effectively suppressed. Due to this, even if the terminal electrode 20 bonded to the solder fillet 70 is separated in respective solder fillets 70, the entire terminal electrode 20 is not separated and conduction between the terminal electrode 20 and the circuit substrate 50 is secured.

Figure 7:
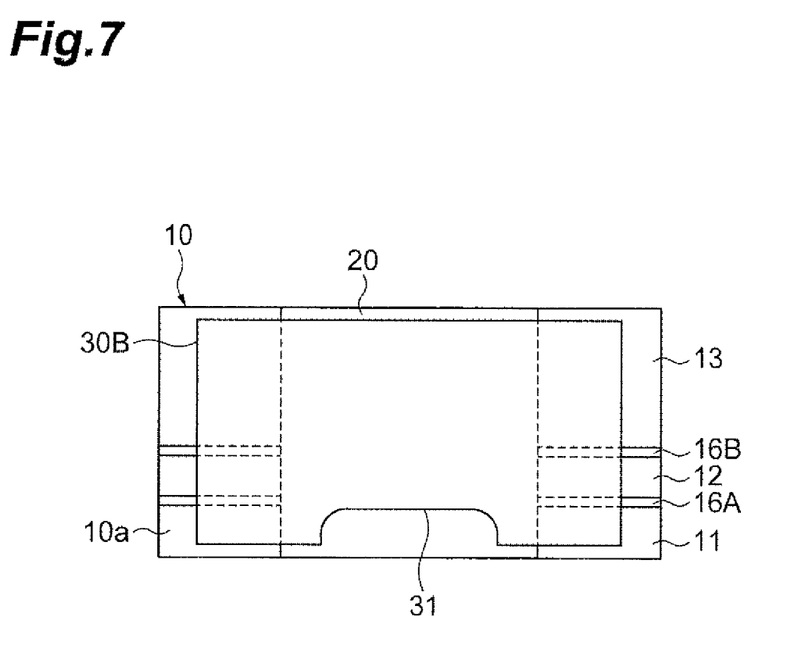
FIG. 7 is a side view illustrating a covering portion of an aspect different from FIG. 4.

A covering portion 30B illustrated in FIG. 7 is different from the above-described covering portion 30 in that the upper recess 32 is not formed and the covering portion does not have a vertically symmetrical form.

Figure 8:
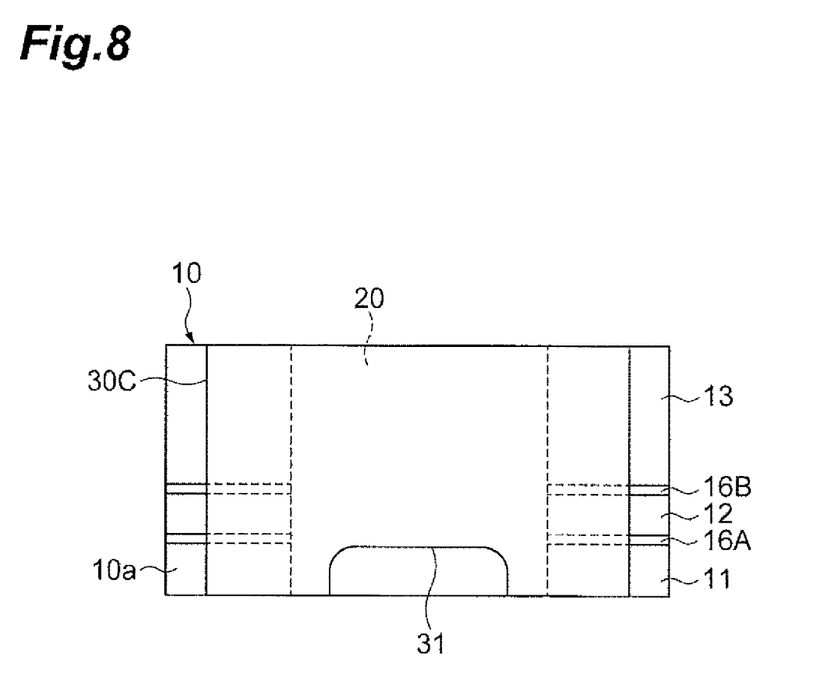
FIG. 8 is a side view illustrating a covering portion of an aspect different from FIG. 4.

A covering portion 30C illustrated in FIG. 8 is different from the covering portion 30B illustrated in FIG. 7 in that the lower end thereof reaches the lower end of the side surface 10a of the element body 10 and the upper end thereof reaches the upper end of the side surface 10a of the element body 10. In such a covering portion 30C, the terminal electrode 20 is exposed in the lower recess 31.

Figure 9:
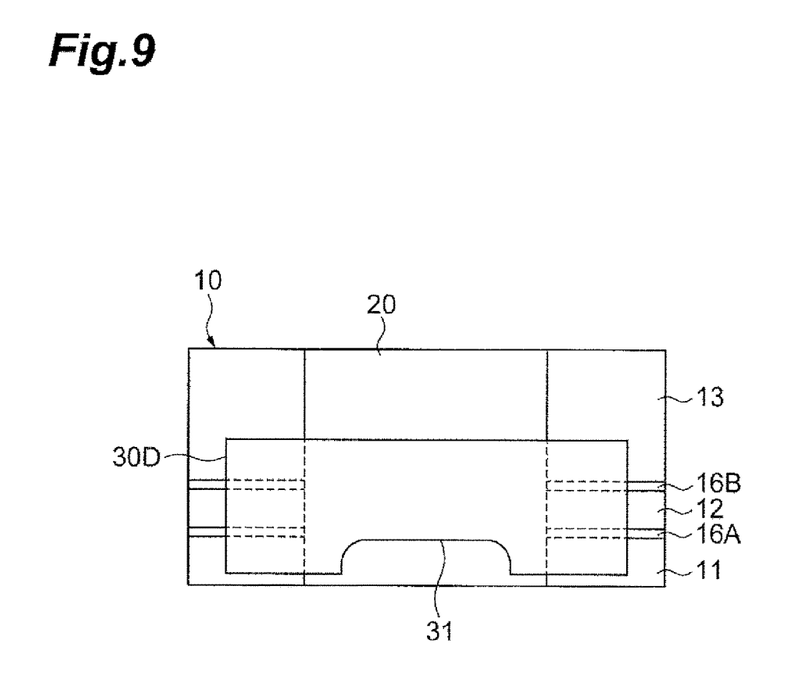
FIG. 9 is a side view illustrating a covering portion of an aspect different from FIG. 4.

A covering portion 30D illustrated in FIG. 9 is designed so that the length in the stacking direction is shorter than that of the covering portion 30B illustrated in FIG. 7 and the height position of the upper end thereof is lower than that of the covering portion 30B.

Figure 10:
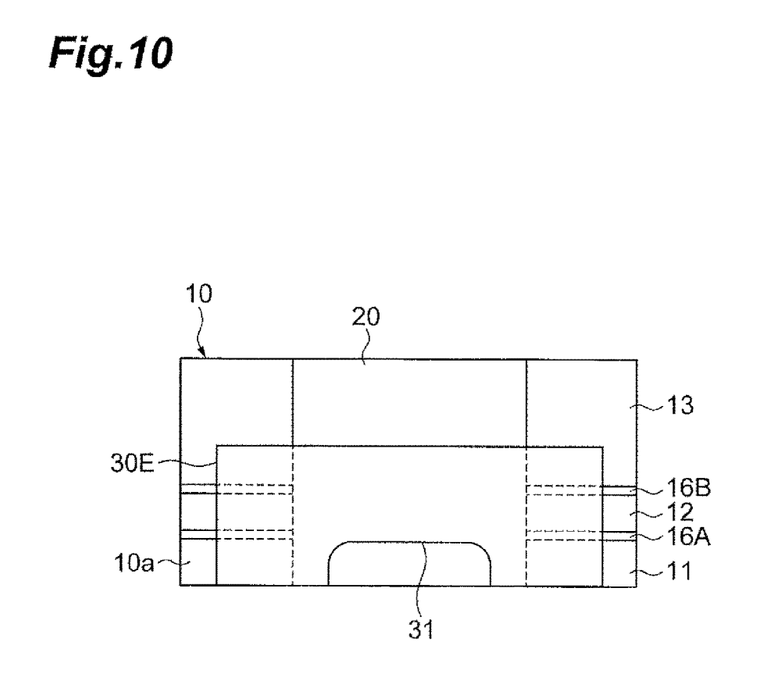
FIG. 10 is a side view illustrating a covering portion of an aspect different from FIG. 4.

A covering portion 30E illustrated in FIG. 10 is different from the covering portion 30D illustrated in FIG. 9 in that the lower end thereof reaches the lower end of the side surface 10a of the element body 10. In such a covering portion 30E, the terminal electrode 20 is exposed in the lower recess 31.

Figure 11A:
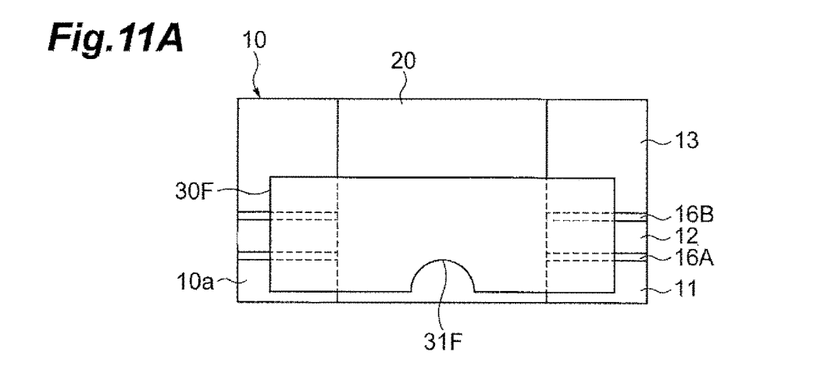
FIGS. 11A to 11C are side views illustrating a covering portion of an aspect different from FIG. 4.
Figure 11B:
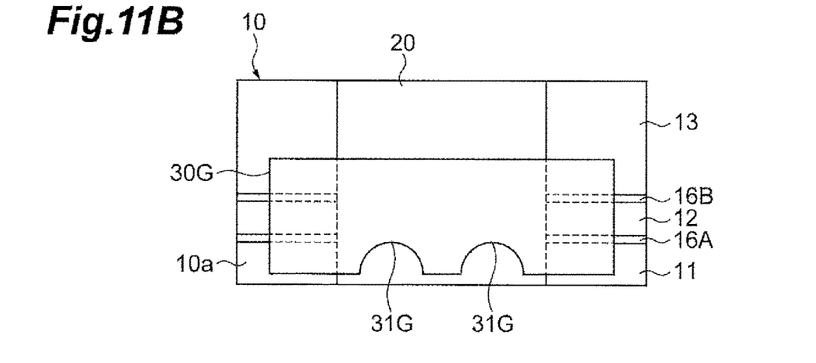
Figure 11C:
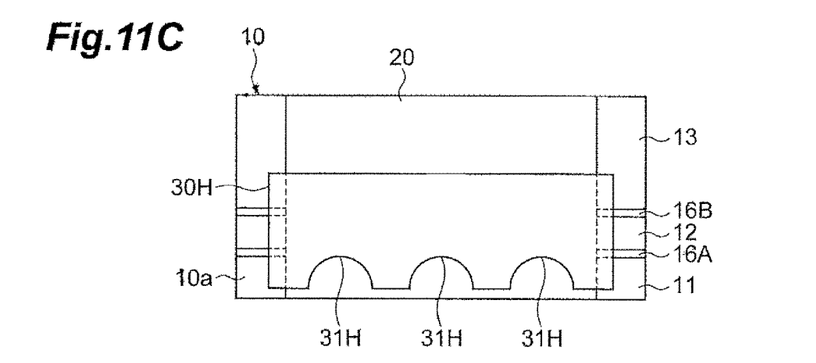

FIGS. 11A to 11C illustrate covering portions 30F to 30H in which the recess has a different shape from the covering portion 30D illustrated in FIG. 9. The covering portions 30F to 30H have semicircular recesses 31F to 31H formed in the lower ends thereof. The covering portion 30F has one recess 31F, the covering portion 30G has two recesses 31G, and the covering portion 30H has three recesses 31H.

An acceleration sensor having the covering portions 30A to 30H described above provides the same advantages as the acceleration sensor 1 having the above-described covering portion 30. That is, since the covering portions 30A to 30H suppress the rise of the solder fillet 70, the operation of the acceleration sensor is not easily limited by the solder fillet 70 and the acceleration sensor can generate electric charge which corresponds to the load more accurately. Therefore, the sensitivity of the acceleration sensor is improved. Moreover, it is possible to easily ensure that the acceleration sensor 1 and the circuit substrate 50 are reliably connected by checking the solder fillets formed in the recesses 31 and 31F to 31H in the lower ends of the covering portions 30A to 30H.

The acceleration sensor according to the embodiment is not limited to the above-described forms but can be modified in various forms.

For example, the dimensions and shapes of the recesses 31 and 31F to 31H can be adjusted appropriately as long as the above-described advantages are obtained. The recess shape is not limited to a right-angled rectangular shape but may be a rounded rectangular shape as illustrated in FIG. 4 and the like and a semicircular shape as illustrated in FIGS. 11A to 11C. In this way, concentration of stress resulting from heat shock or the like can be relieved (that is, stress can be distributed).

Figure 12:
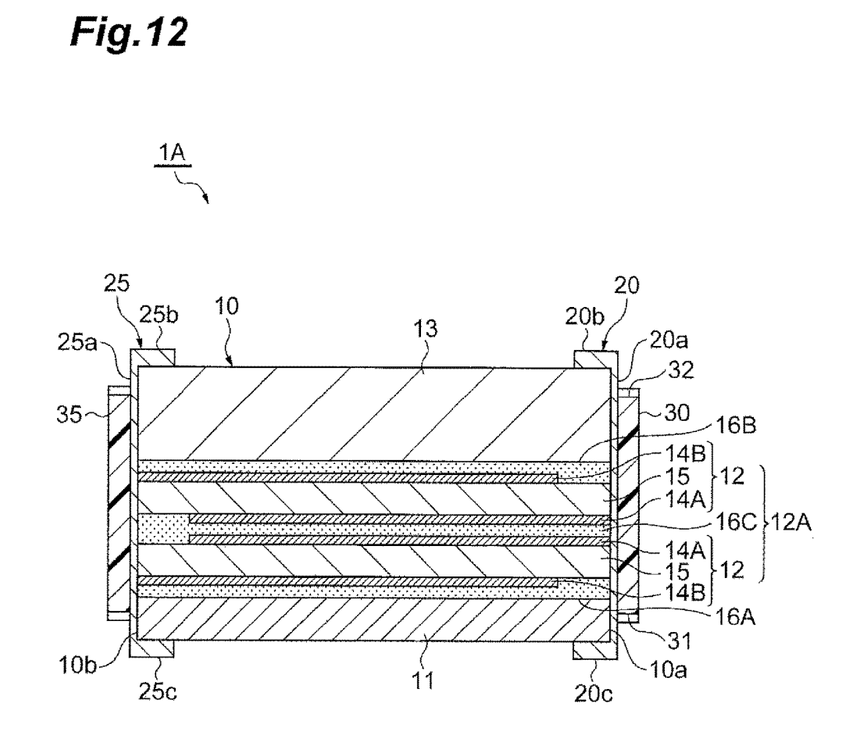
FIG. 12 is a cross-sectional view (along line illustrating an acceleration sensor of another aspect.
Figure 13:
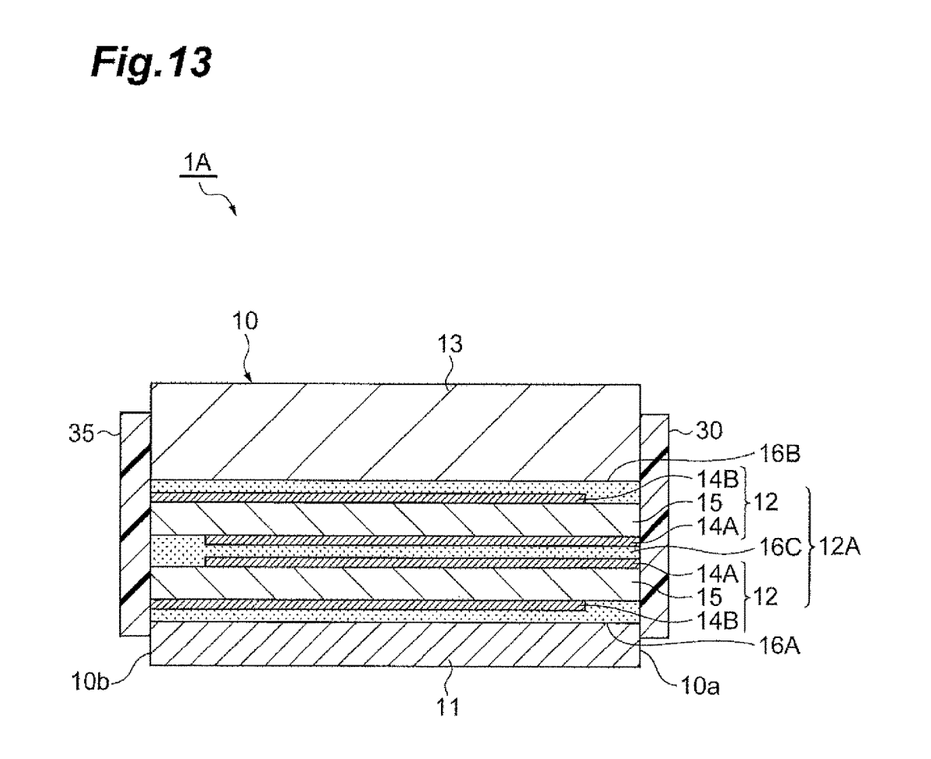
FIG. 13 is a cross-sectional view (along line illustrating an acceleration sensor of another aspect.

Like an acceleration sensor 1A illustrated in FIGS. 12 and 13, a piezoelectric portion 12A may have a structure which includes a plurality of piezoelectric element structures. FIG. 12 corresponds to the cross-sectional view along line II-II of the acceleration sensor 1 illustrated in FIG. 2, and FIG. 13 corresponds to the cross-sectional view along line III-III of the acceleration sensor 1 illustrated in FIG. 3.

The piezoelectric portion 12A of the acceleration sensor 1A includes two piezoelectric element structures 12. Specifically, a piezoelectric element structure 12 which is vertically inverted is disposed on the lower side of the piezoelectric element structure 12, and these two piezoelectric element structures 12 are bonded by an adhesive layer 16C. When the vertically inverted piezoelectric element structures 12 are superimposed, the polarization direction and the electrode polarities are reversed. Due to this, when inertial force acts on a weight layer, the two piezoelectric element structures 12 strengthen the generated electric charge. As a result, the acceleration sensor 1A can improve the sensitivity as compared to the acceleration sensor 1.

Moreover, in the acceleration sensor 1A, the covering portions 30 and 35 are in direct contact with the adhesive layer 16C as well as the adhesive layers 16A and 16B exposed to the side surfaces 10a and 10b of the element body 10, respectively. Due to this, the bonding force of the covering portions 30 and 35 in relation to the element body 10 can be increased further. Therefore, in the acceleration sensor 1A, separation of the covering portions 30 and 35 from the element body 10 is suppressed more effectively. Furthermore, in the acceleration sensor 1A, since the covering portion 30 is provided on the side surface 10a of the element body 10 to extend across the sputtering electrode 20a of the terminal electrode 20, separation of the terminal electrode 20 covered with the covering portion 30 from the element body 10 is suppressed more effectively.

What is claimed is:

1. An acceleration sensor which is to be attached to a substrate by a solder, comprising:
   an element body having a stacked structure;
   a pair of terminal electrodes on which the solder is to be formed; and
   a pair of covering portions, each covering portion covering a corresponding one of the pair of terminal electrodes and being formed of a non-solder-wettable material, wherein
   the element body includes a piezoelectric portion including at least one piezoelectric element structure having a structure in which a piezoelectric layer is sandwiched by a pair of electrode layers in a stacking direction of the element body, a base layer stacked on one side which is a side of the piezoelectric portion facing the substrate, and a weight layer stacked on the other side of the piezoelectric portion,
   each terminal electrode is provided on a corresponding one of two side surfaces of the element body, to which the electrode layers of the piezoelectric portion are drawn, and extends from a height position of the base layer of the element body to at least a height position of the electrode layers,
   the covering portion has an inner side surface that faces the terminal electrode and an outer side surface that faces away from the terminal electrode, and the outer side surface is not provided with any electrode that is electrically connected to the electrode layers, and
   each covering portion covers the corresponding terminal electrode in a portion of the corresponding side surface of the element body, covering at least the electrode layers, and covers the base layer in a state in which at least a portion of the corresponding terminal electrode covering the base layer is exposed.

2. The acceleration sensor according to claim 1, wherein at least one covering portion has a recess which is formed in an end close to the base layer to be depressed toward the piezoelectric layer.

3. The acceleration sensor according to claim 1, wherein at least one covering portion is formed of a resin,
   the piezoelectric portion is bonded to the base layer with a first adhesive layer interposed therebetween and the weight layer with a second adhesive layer interposed therebetween, and
   the at least one covering portion is in direct contact with the first and second adhesive layers exposed to the corresponding side surface of the element body.

4. The acceleration sensor according to claim 3, wherein the first and second adhesive layers are exposed to both of the terminal electrodes in a direction orthogonal to a stacking direction on both of the side surfaces of the element body, and
   each covering portion covers across the corresponding terminal electrode in the direction orthogonal to the stacking direction on the corresponding side surface and is in direct contact with the first and second adhesive layers exposed to the corresponding terminal electrode.

* * * * *